United States Patent [19]
Tuomarla et al.

[11] 3,910,839
[45] Oct. 7, 1975

[54] SLIME INHIBITOR FOR USE IN INDUSTRIAL WATER RECIRCULATING SYSTEMS

[75] Inventors: Juhani Tuomarla; Kalervo Raisanen, both of Vaasa; Aulis Arvinen, Porvoo, all of Finland

[73] Assignee: Kemira Oy, Helsinki, Finland

[22] Filed: Nov. 2, 1972

[21] Appl. No.: 303,673

[30] Foreign Application Priority Data
Nov. 5, 1971 Finland.............................. 3170/71

[52] U.S. Cl..................... 210/60; 210/64; 162/161; 71/67; 424/285
[51] Int. Cl.²...................... A01N 9/22; C02C 5/04
[58] Field of Search........ 210/64, 60; 424/285, 343, 424/349; 162/161; 71/67

[56] References Cited
UNITED STATES PATENTS

| | | | |
|---|---|---|---|
| 2,319,481 | 5/1943 | Stillman et al................. | 424/285 X |
| 2,873,249 | 2/1959 | Schwartz....................... | 162/161 X |
| 2,924,554 | 2/1960 | Manzelli et al................ | 424/285 |
| 3,397,144 | 8/1968 | Liu................................. | 162/161 X |
| 3,470,096 | 9/1969 | Tant et al...................... | 424/285 X |
| 3,524,812 | 8/1970 | Shema et al.................. | 424/349 X |

*Primary Examiner*—Thomas G. Wyse
*Attorney, Agent, or Firm*—Nolte and Nolte

[57] ABSTRACT

This invention relates to a method of inhibition of slime formation in industrial water recirculating systems by treating said systems with 5-nitrofurfurylalcohol, optionally together with further micro-organism inhibitors.

4 Claims, No Drawings

SLIME INHIBITOR FOR USE IN INDUSTRIAL WATER RECIRCULATING SYSTEMS

In water recirculating systems such as cooling towers, heat recovery plants and the recirculated waters of pulp and paper mills, there usually is found an abundance of various micro-organisms which is absence of a suitable inhibitor treatment may cause considerable trouble in the operation of the apparatus, or other unfavourable side effects. In paper mills for instance, the slime brought about by the micro-organisms and consisting of micro-organism units, of material contaminated by them, and of products originating from their metabolism, results in blotches and holes in the paper sheets, thus lowering the quality of the paper. The micro-organisms may even cause discontinuation of the paper production, resulting from reduced paper strength and blockage of the wires.

The inhibitors to be used for the inhibition of micro-organisms in recirculated waters are primarily required to have an effect with a very wide spectrum, the effect being as far as possible independent of environmental factors such as the pH, the temperature, and of other agents simultaneously present in the system. These requirements made on the effect of inhibitors to be used for the treatment of water recirculating systems result in that these agents as a rule have been applicable to other uses as well, such as for the treatment of textiles, leathers, plastics and oils and as preservatives for latex paints.

Particularly for the treatment of the recirculated waters in the pulp and paper industry, various bactericides and fungicides, the so called slime inhibitors, have been used for a long time for eliminating the adverse effects of the micro-organisms. Chlorine, organic mercury compounds, chlorinated phenol derivatives, thiocarbamates, thiocyanates, quaternary ammonium compounds, organic tin and bromine compounds, and esters of aliphatic alcohols with bromine substituted organic acids, have all found use as such agents.

Further it has been established that bromine substituted aliphatic nitroalcohols can be used as inhibitors of micro-organisms, as disclosed in the British Pat. No. 1,057,131. It is also known that 5-nitro-furfuryl-alcohol generally has a preventive effect on bacteria growth (e.g. Dodd, M. C. et al: J. Pharmacol. 82 (1944) 11–18).

When selecting a suitable inhibitor for the treatment of recirculated waters, the primary considerations are the toxicity of the agent, its stability, its ease of application, and its effect on a maximum number of different micro-organism species. Particularly important is the effect of the agent on the maximum number of different species of bacteria, yeast and mold fungi and algae encountered in practice, since in case the effect of the utilized agent with respect of some species is clearly low, these resistant species may be enriched in the system under treatment.

The novel inhibitor according to the present invention eliminates the above mentioned drawbacks and permits effective inhibition of micro-organisms. The characteristics of the invention appear from the appended Patent Claims. It has been found that by the use of the mentioned active substance it is possible effectively to limit the growth of micro-organisms in industrial recirculated waters.

According to the present invention 5-nitro-furfuryl-alcohol has been found to be an effective bactericide which may be used in combination with a substance having fungicidal properties such as 1-bromo-acetoxy-2-nitrobutane, 1,2-bromo-acetoxy-ethane, 8-hydroxy-chinoline, copper-8-hydroxy-chinolinate, bis-1,4-bromo-acetoxy-2-butene or 3,5-dimethyl-1,3,5,2H-tetrahydrothio-diazine-2-thione. Such a mixture has a combined effect preventing the growth both of bacteria and fungi. When the mixture contains two different active substances, the number of resistant micro-organisms will further be considerably less than for each substance alone, since the effect spectra are not identical.

The use of the active substances according to the invention is particularly applicable for the recirculated water in the pulp and paper industry.

For the effective use of the substances according to the invention for the treatment of circulated waters the substances must be coverted into water soluble or easily dispersible form. For such purposes various inorganic and organic acids and aliphatic or aromatic solvents can be utilized. When desired, a small amount of surfactive agents may be added to the solution. These substances may be utilized also as solid mixtures containing dispersing agents.

For testing the effect of the substances according to the invention, e.g. the laboratory method presented by J. H. Conkey and J. A. Carlsson in TAPPI 46 (1963) (5) 23-24 may be utilized, according to which method the effect of active substance added to a nutritive substrate on an organism transplanted to the same, is measured by determining the quantity of active substance necessary for preventing the growth of a bacterial or fungal organism transplanted to the substrate.

The results of effect measurements carried out with 5-nitro-furfuryl-alcohol on *Aerobacter aerogenes*, *Bacillus subtilis*, *Penicillium expansum* and *Aspergillus niger* using an incubation period for *A. aerogenes* and *B. subtilis* of one day and for *P. expansum* and *A. niger* of 14 days, are summarised in the following Table 1. As nutritive substrate was used Bactotryptone-glucose-extract-agar for *A. aerogenes* and for *B. subtilis*, and Bacto-agar for *P. expansum* and *A. niger*.

Table 1

| | Concentration of active substance mg/l | | | | | | | | |
|---|---|---|---|---|---|---|---|---|---|
| | 2.5 | 5 | 7,5 | 10 | 25 | 50 | 100 | 200 | 300 |
| A.aerogenes | ++ | + | − | − | − | − | − | − | − |
| B.subtilis | + | − | − | − | − | − | − | − | − |
| P.expansum | ++ | ++ | ++ | ++ | ++ | ++ | + | − | − |
| A.niger | ++ | ++ | ++ | ++ | ++ | ++ | ++ | + | − |

Table 2 contains the results of effect measurements with a mixture containing in addition to 5-nitro-furfuryl-alcohol, 8-hydroxy-chinoline in a ratio of 1:1. The conditions were similar to those of Table 1.

Table 2

| | Concentration of active substance mg/l | | | | | | | | |
|---|---|---|---|---|---|---|---|---|---|
| | 2,5 | 5 | 7,5 | 10 | 25 | 50 | 100 | 200 | 300 |
| A.aerogenes | ++ | ++ | + | + | − | − | − | − | − |
| B.subtilis | − | − | − | − | − | − | − | − | − |
| P.expansum | ++ | ++ | ++ | + | − | − | − | − | − |
| A.niger | ++ | ++ | ++ | ++ | ++ | ++ | − | − | − |

Explanation of the notations in the Tables:

− no growth
+ meager growth
++ abundant growth

Industrial recirculated waters often contain species of micro-organisms, with respect of which the effect of an inhibitor is very difficult to assess soley on the bais of laboratory tests.

A more accurate picture is of course obtainable by tests carried out, in normal operational conditions of which an example is given below.

EXAMPLE

Into the water recirculating system of a Fourdrinier paper machine producing 40 tons coated printing papers per day, there was added twice a day 1,4 kgs of a solution containing 17,5% of 5-nitro-furfuryl-alcohol, 17,5% of 8-hydroxy-chinoline and 65% of solvents. The dosage was carried out by feeding a unit dose during a period of 20 minutes into the paper machine chest having a capacity of about 30 cubic meters. During a test period of four weeks the effect of the inhibitor treatment was observed by taking water samples from the paper machine head box once a week after 1, 2, 4 and 6 hours following the dosage, and by determining the organism concentration in such samples. In addition the condition of the water recirculation system was observed by inspecting the cleanness of the piping, basins and head boxes included therein.

The results of the microbiological tests carried out on the water samples are presented in Table 3.

Table 3

| Time of sampling, hours after dosage | Concentration of organism, units/ml | | | |
|---|---|---|---|---|
| | 1st week | 2nd week | 3rd week | 4th week |
| 1 | 400 | 600 | 500 | 4 500 |
| 2 | 300 | 1 000 | 800 | 4 800 |
| 4 | 100 | 100 | 700 | 8 400 |
| 6 | 11 000 | 900 | 1 400 | 28 000 |
| Average | 2 950 | 650 | 850 | 11 425 |

After the test period a conventional slime inhibitor was utilized, its concentration of active substance and manner of application corresponding to the conditions during the test period. Water samples were taken in the same manner as during the test period. The average of the micro-organism concentration one week after termination of the experiment was 60,000 and after three weeks 980,000 units/ml.

The test results show, that the composition according to the invention has maintained the concentration of micro-organisms very low.

The inspections of the equipment included in the water recirculation system also showed, that all equipment was maintained clean during the entire period. No detrimental effects on the paper were observed. As the product is water soluble no dispersing agents are necessary and its effect on the sizing of the paper has been found to be less than usual even used in high concentrations.

We claim:

1. A method of inhibiting slime formation in a water recirculating system of a pulp or cellulose factory wherein said water contains at least one bacteria species selected from the group consisting of *Aerobacter aerogenes* and *Aspergillus niger* which comprises adding to said water system containing said bacteria an inhibiting concentration of 5-nitro-furfurylalcohol.

2. A method according to claim 1 wherein the sole slime inhibiting agent is said 5-nitro-furfurylalcohol.

3. A method according to claim 1 wherein the water is treated with a slime inhibiting agent which slime inhibiting agent consists of 5-nitro-furfurylalcohol and a second micro-organism inhibitor selected from the group consisting of 1-bromoacetoxy-2-nitrobutane, 1,2-bromoacetoxyethane, 8-hydroxychinoline, copper 8-hydroxychinolinate, bis-1,4-bromoacetoxy-2-butene and 3,5-dimethyl-1,3,5, 2H-tetrohydrothiodiazin-2-thion.

4. A method according to claim 3, in which the second inhibitor is 8-hydroxychinoline.

* * * * *